(12) United States Patent
Johnstone et al.

(10) Patent No.: US 12,236,405 B1
(45) Date of Patent: *Feb. 25, 2025

(54) SYSTEMS AND METHODS FOR REAL-TIME TRICKLE PAYMENTS

(71) Applicant: Wells Fargo Bank, N.A., San Francisco, CA (US)

(72) Inventors: Eileen Johnstone, Ventnor, NJ (US); Michael Knorr, Fairfield, CT (US); Thomas R. Miller, Levittown, PA (US); Catherine Wangari Mwangi, Hackensack, NJ (US); Mercedes Roldan-Colon, Bala Cynwyd, PA (US); Jessica A. Weng, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,617

(22) Filed: Jul. 26, 2021

Related U.S. Application Data

(63) Continuation of application No. 15/582,214, filed on Apr. 28, 2017, now Pat. No. 11,074,558.

(51) Int. Cl.
*G06Q 20/08* (2012.01)
*G06Q 20/02* (2012.01)
*G06Q 20/28* (2012.01)

(52) U.S. Cl.
CPC ......... *G06Q 20/0855* (2013.01); *G06Q 20/02* (2013.01); *G06Q 20/28* (2013.01)

(58) Field of Classification Search
CPC .... G06Q 20/0855; G06Q 20/02; G06Q 20/28; G06Q 20/00; G06Q 20/4014; G06Q 40/00

(Continued)

(56) References Cited

U.S. PATENT DOCUMENTS 5,644,727 A * 7/1997 Atkins .................... G07F 9/001
705/40
5,852,811 A * 12/1998 Atkins .................... G06Q 40/06
705/37

(Continued)

OTHER PUBLICATIONS

Amazon Payments, retrieved from: http://www.amazon.com/gp/help/customer/display.html/ref=xm_1161282_cont_home?nodeId=1161282.

(Continued)

*Primary Examiner* — Hani M Kazimi
*Assistant Examiner* — Sanjeev Malhotra
(74) *Attorney, Agent, or Firm* — Foley & Lardner LLP

(57) ABSTRACT

Systems, methods, and apparatuses for real-time trickle payments are provided. A system includes a processing circuit configured to: receive a request from a consumer device to commission a service provided by a supplier; place a financial hold on funds allocated to a supplier financial account based on performance terms of a smart contract; detect initiation of performance of the requested service based on performance information from a mobile device associated with the supplier and correlating the performance information to the smart contract; increase a financial hold on funds allocated to a consumer financial account in a hold amount proportional to the monitored performance, and decrease the financial hold on the funds allocated to the supplier financial account in the hold amount proportional to the monitored performance; and, upon the completion of the requested service, release the funds on hold in the supplier financial account.

15 Claims, 5 Drawing Sheets

(58) Field of Classification Search
USPC ........ 705/14.1, 19, 36 R, 37, 39, 40, 41, 44, 705/79; 726/4
See application file for complete search history.

(56) References Cited

U.S. PATENT DOCUMENTS

| | | | |
|---|---|---|---|
| 5,875,437 A * | 2/1999 | Atkins | G06Q 20/102 705/40 |
| 6,108,641 A | 8/2000 | Kenna et al. | |
| 6,606,606 B2 | 8/2003 | Starr | |
| 7,536,350 B1 | 5/2009 | Bent et al. | |
| 8,204,809 B1 * | 6/2012 | Wise | G06Q 40/06 705/36 R |
| 8,682,802 B1 | 3/2014 | Kannanari | |
| 2002/0095386 A1 | 7/2002 | Maritzen et al. | |
| 2002/0128912 A1 | 9/2002 | Vindeby | |
| 2004/0073688 A1 | 4/2004 | Sampson | |
| 2006/0064378 A1 | 3/2006 | Clementz et al. | |
| 2007/0174189 A1 * | 7/2007 | Bishop | G06Q 40/03 705/39 |
| 2007/0192216 A1 | 8/2007 | Arnold et al. | |
| 2007/0198406 A1 * | 8/2007 | Bishop | G06Q 20/04 705/40 |
| 2008/0140562 A1 * | 6/2008 | Kerdachi | G06Q 20/102 705/40 |
| 2009/0076956 A1 * | 3/2009 | Bishop | G06Q 30/0601 705/40 |
| 2009/0076957 A1 * | 3/2009 | Bishop | G06Q 40/00 705/40 |
| 2009/0083181 A1 * | 3/2009 | Bishop | G06Q 20/10 705/41 |
| 2009/0157518 A1 * | 6/2009 | Bishop | G06Q 20/20 705/19 |
| 2009/0187482 A1 * | 7/2009 | Blount | G06Q 40/02 705/14.1 |
| 2010/0169236 A1 | 7/2010 | Bregstein et al. | |
| 2010/0241545 A1 | 9/2010 | O'Connor et al. | |
| 2011/0010289 A1 | 1/2011 | Kranzley | |
| 2011/0289006 A1 * | 11/2011 | Hutchison | G06Q 20/02 705/79 |
| 2012/0271770 A1 | 10/2012 | Harris et al. | |
| 2012/0303498 A1 | 11/2012 | Cova et al. | |
| 2013/0290187 A1 * | 10/2013 | Itwaru | G06Q 20/3227 705/44 |
| 2014/0207668 A1 | 7/2014 | Hermansen et al. | |
| 2014/0229375 A1 | 8/2014 | Zaytzsev et al. | |
| 2014/0279475 A1 | 9/2014 | Castrechini et al. | |
| 2014/0379562 A1 * | 12/2014 | Olson | G06Q 20/027 705/39 |
| 2015/0113609 A1 * | 4/2015 | Joyce | G06Q 20/403 726/4 |
| 2015/0120546 A1 | 4/2015 | Fernandes | |
| 2015/0149352 A1 * | 5/2015 | Nichols | G06Q 20/10 705/40 |
| 2016/0330027 A1 | 11/2016 | Ebrahimi | |
| 2016/0335633 A1 * | 11/2016 | Joyce | G07F 7/122 |
| 2017/0109715 A1 | 4/2017 | Aguirre et al. | |
| 2017/0132615 A1 * | 5/2017 | Castinado | G06Q 20/223 |
| 2017/0132630 A1 * | 5/2017 | Castinado | G06F 16/2255 |
| 2017/0147975 A1 | 5/2017 | Natarajan et al. | |

OTHER PUBLICATIONS

Crowe et al., Is Payment Tokenization Ready for Primetime?, Jun. 11, 2015, Federal Reserve Bank of Atlanta, 51 pages.

Inaba, Tatsuya; Impact Analysis of RFID on Financial Supply Chain Management, IEEE Conference on Service Operations and Logistics and Informatics. Year 2007, pp. 1-6.

Yeung, K., FFD01CBanking startup Clearbanc launches with a new instant pay tool for Uber drivers,FFD01D Business, retrieved from: http://www.venturebeat.com/2015/10/15/banking-startup-clearbanc-launcheswith-a-new-instant-pay-tool-for-uber-drivers/ , 5 pages (Oct. 15, 2015).

* cited by examiner

SYSTEMS AND METHODS FOR REAL-TIME TRICKLE PAYMENTS

CROSS-REFERENCE TO RELATED APPLICATION

This application is a continuation of and claims priority to U.S. patent application Ser. No. 15/582,214, entitled "Systems and Methods for Real-Time Trickle Payments," filed Apr. 28, 2017, which is incorporated herein by reference in its entirety and for all purposes.

BACKGROUND

The access economy has exploded onto the global stage in various formats and iterations. The access economy is a business model based on goods and services being traded on the basis of access rather than ownership. In general, the access economy relies on temporarily renting goods or services, rather than selling them permanently. Originally, the access economy was focused on transportation and lodging, such as ride sharing services (Uber®, Lyft®, etc.) or home-sharing companies, such as Airbnb®. However, the access economy has evolved to include car sharing services, airplane sharing services, boat sharing services, bicycle sharing services, parking space sharing services, etc. Further, services have evolved within the access economy to provide other services. For example, the need for employment services, such as providing labor for a company at the convenience of a consumer to provide a flexible workforce, has increased. Examples include Amazon® Flex, which allows persons with vehicles to deliver packages in their free time. Other examples can include professional services, such as services provided by mechanics, lawyers, IT professionals, medical professionals, chefs, etc. By using the access economy, people can offer their services via one or more service sharing services, allowing them to provide freelance services at their convenience.

Most services within the access economy rely on one or more technology platforms to connect suppliers of the assets and/or services to consumers or companies. Often, these technology platforms are accessed via an application on a mobile phone and/or other mobile device. However, in some instances, access may be via a standard web-based interface, such as via a website. These technology platforms are generally set up by a third party who assists by coordinating between the suppliers and the consumers. In most cases, these third-parties also process the payment from the consumer to the supplier. The third party takes a portion of the proceeds for providing this service. The third party may also withhold funds as they relate to regional taxes, surcharges etc. The remaining funds are then transferred to an account associated with the supplier. However, these payments may only be made at certain intervals, such as weekly, bi-weekly, or even monthly. This can be burdensome to suppliers, especially where certain fees or costs, such as tolls, dues, maintenance, cleaning services, etc., are required to be paid by the supplier. Thus, it would be desirous to have a platform which would allow for payments to be made to a supplier in real time as the services are being performed.

SUMMARY

According to one example embodiment, a computer-implemented method performed by an access economy payment system includes receiving a request from a consumer to commission an access economy service provided by a supplier. The method also includes generating a smart contract based on the requested access economy service and generating a consumer sub-account associated with a consumer financial account. The method further includes allocating funds from the consumer financial account to the consumer sub-account, and generating a supplier sub-account associated with a supplier financial account. The method further includes allocating funds to the supplier sub-account and placing a financial hold on the funds allocated to the supplier sub account. Wherein amounts of the funds allocated to the supplier sub-account and amounts of the financial hold on the funds allocated to the supplier sub-account are based on the terms of the smart contract. The method also includes detecting the initiation of performance of the requested access economy service and monitoring the performance of the initiated access economy service. The method also includes increasing a financial hold on the funds allocated to the consumer sub-account and decreasing the financial hold on the funds allocated to the supplier sub-account in real-time based on each of the monitored performance and the terms of the smart contract. The method further includes, upon the completion of the requested access economy service, transferring the funds not on hold in the consumer sub-account to the consumer financial account, transferring the funds not on hold in the supplier sub-account to the supplier financial account, and netting the funds on hold in the consumer sub-account against the funds on hold in the supplier sub-account.

According to another example embodiment, a system includes a service monitoring device associated with a supplier of an access economy service. The system further includes a user device associated with a consumer of an access economy service and a work events monitoring system in communication with the service monitoring device. The work events monitoring system comprises a processor and instructions stored in non-transitory machine-readable media. The instructions are configured to cause the work event monitoring system to receive a request from the user device to commission an access economy service from the supplier. The instructions are further configured to generate a smart contract based on the requested access economy service and to generate a consumer sub-account associated with a consumer financial account. The instructions are also configured to generate a supplier sub-account associated with a supplier financial account. The instructions are also configured to allocate funds from the consumer financial account to the consumer sub-account, wherein a financial hold is placed on the funds allocated to the supplier sub-account and wherein the amounts of the funds allocated to the supplier sub-account and of the financial hold on the funds allocated to the supplier sub-account are based on the terms of the smart contract. The instructions are further configured to detect the initiation of performance of the requested access economy service and to monitor the performance of the initiated access economy service. The instructions are further configured to increase a financial hold on the funds allocated to the consumer sub-account and to decrease the financial hold on the funds allocated to the supplier sub-account in real-time based on each of the monitored performance and the terms of the smart contract. The instructions are also configured to, upon completion of the requested access economy service, transfer the funds not on hold in the consumer sub-account to the consumer financial account, transfer the funds not on hold in the supplier sub-account to the supplier financial account, and net the funds on hold in the consumer sub-account against the funds on hold in the supplier sub-account.

According to another example embodiment, a real-time trickle payment system for use with an access economy service includes a service monitoring device associated with a supplier of an access economy service and a user device associated with a consumer of an access economy service. The system further includes a work events monitoring system in communication with the service monitoring device and the user device. The work events monitoring system comprises a processor and instructions stored in non-transitory machine-readable media, the instructions configured to cause the work event monitoring system to receive a request from the user device to commission an access economy service from a supplier. The instructions are configured to cause the work event monitoring system to receive a request from the user device to commission an access economy service from the supplier. The instructions are further configured to generate a smart contract based on the requested access economy service and to generate a consumer sub-account associated with a consumer financial account. The instructions are also configured to generate a supplier sub-account associated with a supplier financial account. The instructions are also configured to allocate funds from the consumer financial account to the consumer sub-account, wherein a financial hold is placed on the funds allocated to the supplier sub-account and wherein the amounts of the funds allocated to the supplier sub-account and of the financial hold on the funds allocated to the supplier sub-account are based on the terms of the smart contract. The instructions are further configured to detect the initiation of performance of the requested access economy service and to monitor the performance of the initiated access economy service. The instructions are further configured to increase a financial hold on the funds allocated to the consumer sub-account and to decrease the financial hold on the funds allocated to the supplier sub-account in real-time based on each of the monitored performance and the terms of the smart contract. The instructions are also configured to, upon completion of the requested access economy service, transfer the funds not on hold in the consumer sub-account to the consumer financial account, transfer the funds not on hold in the supplier sub-account to the supplier financial account, and net the funds on hold in the consumer sub-account against the funds on hold in the supplier sub-account.

BRIEF DESCRIPTION OF THE FIGURES

The details of one or more implementations are set forth in the accompanying drawings and the description below. Other features, aspects, and advantages of the disclosure will become apparent from the description, the drawings, and the claims.

DETAILED DESCRIPTION

Figure 1:
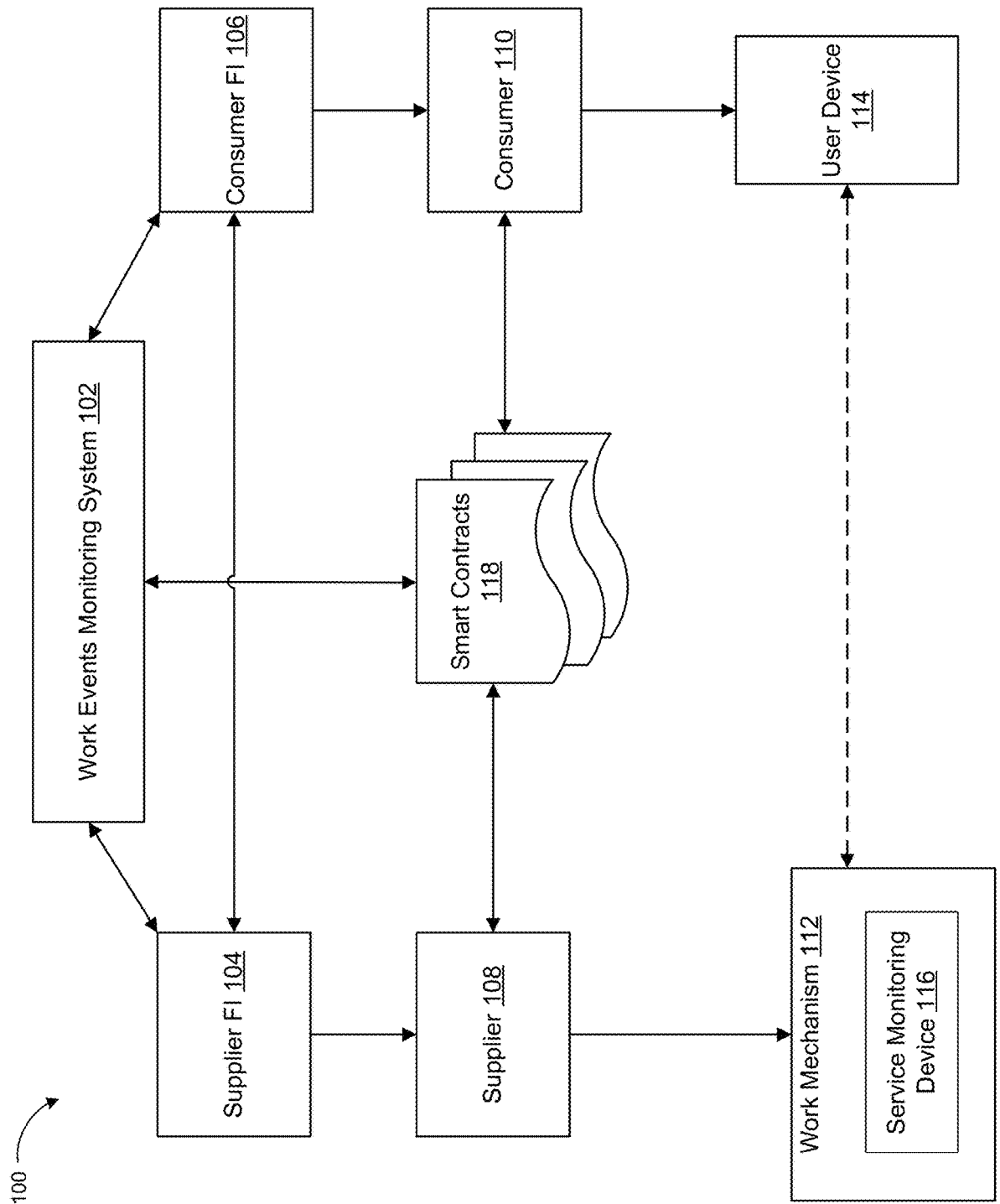
FIG. 1 is a block diagram of an access economy service system, according to an embodiment.

Before turning to the figures, which illustrate example embodiments, it should be understood that the application is not limited to the details or methodology set forth in the following description or illustrated in the figures. It should also be understood that the phraseology and terminology employed herein is for the purpose of description only and should not be regarded as limiting.

The access, or gig, economy has created a tremendous amount of jobs in the last decade. The rise of access based services, such as ride-sharing, home rentals, consumer directed services, etc., has created sources of income for supplier's goods and/or services within the access economy and allowed many consumers to reap the benefits of access to the supplied goods and/or services. As the access economy has grown, many access service providers, such as Uber® and Airbnb®, have come onto the market to create entry points into the access economy. These service providers not only serve to connect consumers to suppliers but also to provide support to the suppliers, such as by providing payment services (e.g. facilitating payments between the consumers and the suppliers), payrolls services (e.g. tax withholding), scheduling services, and other services. While these services make many aspects of participating in the access economy more practical for suppliers, it can often be the case that payment is not provided until after the requested services or good rental is completed, sometimes a significant amount of time after completion.

Financial institutions (FIs) are generally involved with the access economy by facilitating the transfer of funds from the consumer to the supplier. Often, FIs control the transfer of money from a consumer account to a service provider associated with the requested service or good. The service provider then facilitates payment to the supplier, often with taxes as well as any fees (regulatory or internal to the service provider) withheld by the service provider. The remaining funds are then transferred to an account associated with the supplier. Accordingly, FIs and the service providers interact with each other to control the flow of payment from the consumer to the supplier. This system is functional but may create issues where the service takes place over a certain period of time or where there are expenses associated with the rental of the services or goods that may be required to be borne by the supplier until payment is received from the service provider.

Referring generally to the figures, systems and methods for providing a real-time trickle payment for an access economy based interaction are shown. According to various embodiments, a work events monitoring system can provide an interface between a user (via a user device) and a supplier (via a service monitoring device). The work events monitoring system may be further in communication with FIs associated with the supplier and the consumer to facilitate the transfer of funds between the respective FIs. Further, the work events monitoring system can generate one or more smart contracts associated with the service or good being provided to the consumer by the supplier. The smart contracts may be used to establish which service or good will be provided to the consumer and what price the consumer will pay for access to the good or service. In some embodiments, the work events monitoring system can configure the smart contracts such that payments are made in real time based on the usage of the good by the consumer and/or the amount of service provided by the supplier to the consumer. This can allow the supplier to be paid nearly contemporaneously with the performance of a service and/or rental of a good.

According to various embodiments, described in further detail below, utilizing smart contracts in combination with constantly monitoring the performance of a service for the duration of a rental can provide an improved interface between consumers and suppliers in an access economy transaction by allowing for real-time payments to be made to the supplier based on the terms set by the smart contract. By allowing payments to be automatically allocated to the supplier based on the performance of a service (trickle payments), additional value-add functionality can be achieved as the supplier can receive payments throughout the performance of the service, or rental of the good, thereby allowing the supplier to have access to funds which may be needed to complete the service. This can reduce hesitation by suppliers to provide goods or services due to timing issues with receiving payment for supplying the access economy goods and/or services. Further, utilizing real-time trickle payments can allow the consumer to be sure that they will not be charged or be required to pay for a service not rendered by the supplier. Accordingly, the embodiments described herein solve the technical and internet-centric problems of providing real-time trickle payments to a user based on the services or goods actually utilized at a given moment.

FIG. 1 is a block diagram of an access economy service system 100, according to an embodiment. The access economy service system 100 may include a work event monitoring system 102, a supplier FI 104, a consumer FI 106, a supplier 108, a consumer 110, a work mechanism 112, and a user device 114. In some embodiments, the work mechanism 112 may include a service monitoring device 116. In one embodiment, the work event monitoring system 102 may be a service provider associated with an access economy service. For example, the work event monitoring system 102 may be associated with an access economy service, such as a ride share service (e.g. Uber®, Lyft®, etc.). In other examples, the work event monitoring system 102 may be associated with other access economy services, such as home rental services (e.g. Airbnb®), plane sharing services, boat sharing services, etc. Other services, such as flexible employment services (e.g. Amazon® Flex), IT timeshare services, legal services, mechanic services, food delivery services, medical services, etc., may be further examples of access economy services provided by the work event monitoring system 102. The above-listed access economy services are for illustrative purposes only and do not limit the number or type of access economy services that may be provided via the work event monitoring system 102.

The work event monitoring system 102, the user device 114 and the service monitoring device 116 may each include a computer system (e.g., one or more servers, each with one or more processing circuits), each including a processor and a memory. The processors may be implemented as application specific integrated circuits (ASICs), one or more field programmable gate arrays (PFGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be, or include, non-transient volatile memory, non-volatile memory, and non-transitory computer storage media. The memory may include database components, object code components, script components, or any other type of information structure for supporting the various activities and information structures described herein. The memory may be communicably connected to the processor and may include computer code or instructions for executing one or more processes described herein. The work event monitoring system 102 may include a server-based computing system, comprising, for example, one or more networked computer servers that are programmed to perform the operations described herein. The work event monitoring system 102 may be implemented as a distributed computer system where each function is spread over multiple computer systems.

The work event monitoring system 102 may be a centralized server connected to one or more of the other listed components within the access economy service system 100 via a network. In some embodiments, the network may be an internet based network. For example, all components of access economy service system 100 may be in communication with a cloud-based network, as will be described in more detail below. In some embodiments, the network connections between the components are wired network connections, such as a TCP/IP network. In other embodiments, the network connections may be wireless network, such as Wi-Fi, Wi-Max, cellular (3G, 4G, LTE, CDMA), LORA, Zigbee, Near Field Communication (NFC), Bluetooth, or any other applicable wireless network protocols. In some embodiments, the work event monitoring system 102 is hosted by a third party, such as a access economy service provider. In other embodiments, the work event monitoring system 102 may be associated with one or more FIs within the access economy service system 100. For example, the work event monitoring system 102 may be associated with one or more of the supplier FI 104 and the consumer FI 106.

The supplier FI 104 is an FI associated with the supplier 108 of an access economy good or service, such as those described above. In one embodiment, the supplier FI 104 is a bank. However, in other examples, the supplier FI 104 may be a credit union, a brokerage house, or other applicable type of FI that the supplier 108 may use to perform financial transactions. Similarly, the consumer FI 106 is an FI associated with the consumer 110 of an access economy good or service, such as those described above. In one embodiment, the consumer FI 106 is a bank. However, in other examples, the consumer FI 106 may be a credit union, a brokerage house, or other applicable type of FI that the supplier 108 may use to perform financial transactions. As shown in FIG. 1, the supplier FI 104 and the consumer FI 106 are separate entities; however, it is contemplated that the supplier FI 104 and the consumer FI 106 may be the same entity in some embodiments.

For purposes of this disclosure, the supplier 108 is understood to be a supplier of a good or service in an access economy, and the consumer 110 is understood to be a consumer, or purchaser, of the goods or services supplied by the supplier 108 in the access economy. In some examples, the supplier 108 and/or consumer 110 may be institutions, groups of persons, co-ops, partnerships, or other groups either suppling or consuming the goods or services.

In one embodiment, the supplier 108 may be in communication with the work mechanism 112. In one embodiment, the work mechanism 112 is a physical embodiment of the good or service supplied by the supplier 108. For example, where the supplier 108 is supplying a service, such as a ride-sharing service, the work mechanism 112 may be the supplier's 108 vehicle. In other examples, such as where the service is a home sharing service, the work mechanism 112 may be the home itself. In a further example, the work mechanism 112 may be a plane (plane sharing service), a boat (boat sharing service), or simply labor, such as where the contracted service is for professional services (e.g. mechanic services, legal services, medical services, caregiver services, food preparation services, etc.). In general, the work mechanism 112 can be any device and/or service provided to a consumer 110 by the supplier 108.

In some embodiments, the work mechanism 112 includes the service monitoring device 116. The service monitoring device 116 may be any device that provides monitoring of the supplied good or/service. For example, where the access economy service is a ride sharing service, the service monitoring device 116 may be a device that monitors the distance travelled for a particular ride, as well as the duration of a given ride. In some examples, the service monitoring device 116 may monitor other parameters associated with a ride, such as fuel expended, number of passengers, time of day, tolls or other required fees that were paid during the duration of the trip, etc., In some examples, the service monitoring device 116 may be a device that can be plugged into a communication port of the work mechanism 112. For example, where the work mechanism 112 is a vehicle, the service monitoring device 116 may plug into the vehicle's OBD-II port. In other embodiments, the service monitoring device 116 may connect to the vehicle via a wireless connection, such as via Bluetooth. In still other embodiments, the service monitoring device 116 may be able to communicate with the vehicle via a Universal Serial Bus (USB) port.

In some embodiments, the service monitoring device 116 may be a software application associated with a personal device of the supplier 108, such as a smartphone. For example, where the access economy service is a ride sharing service, the supplier 108 may have a software application on their smartphone, or other portable smart device, which can utilize sensors within the smartphone to monitor the work being performed. For example, the application may use a GPS sensor associated with the device of the supplier 108 to monitor the distance travelled. In other examples, a software application may be used as the service monitoring device 116 for other types of access economy services, such as home rentals, professional services, or any other type of access economy service. For example, where the access economy service is a home rental service, a software application may be provided to a user device associated with the consumer 110, such as user device 114. The consumer 110 may check into and out of the home using the software application on the user device 114. Similarly, where the access economy service is related to rental of other goods, such as cars, boats, planes, etc., the consumer 110 may have a software application on the user device 114, allowing the consumer 110 to "check-in" when they begin using the good and "check-out" when they finish. In some embodiments, sensors within the user device 114 may be used to provide an indication when the consumer 110 starts and stops using the good. In other embodiments, the supplier 108 may install one or more service monitoring devices 116 in the goods to be used that can monitor when the consumer 110 starts and stops using the good. In some embodiments, the service monitoring device may be one or more internet of things (IoT) devices. For example, where the access economy service is a home rental, a connect smart-lock may monitor when the consumer enters or leaves the property. Further, other IoT devices, such as connected sensors, cameras, thermostats, lights, appliances, and the like may be used to monitor the use of the supplied good or service.

In some embodiments, the service monitoring device 116 may be a simple interface that can allow the supplier 108 to indicate when they begin and end the provision of a service. For example, where the access economy service is a professional service, such as legal services, the supplier 108 may be able to indicate on a software application when the work is being done. In further embodiments, the supplier 108 may use the service monitoring device 116, such as a smartphone with a software application, to initiate communications with the consumer 110. For example, where the professional service is a counseling service (e.g., medical counseling, legal counseling, etc.), the service monitoring device 116 may provide the interface between the supplier 108 and the consumer 110, such as by providing a video conference between the parties. In some embodiments, the service monitoring device 116 is associated with the work event monitoring system 102. For example, where the service monitoring device 116 is a physical device, such as a monitoring device for plugging into a vehicle, the service monitoring device 116 may be supplied by the work event monitoring system 102 (i.e. the access economy service provider) as part of participating in the service. In other embodiments, the work event monitoring system 102 may provide a software application, such as those described above, for download by the supplier 108 and/or the consumer 110.

The user device 114 may be any device associated with the consumer 110 that can communicate with one or more of the work event monitoring system 102, the work mechanism 112, and/or the service monitoring device 116. In some embodiments, the user device 114 may be a user interface on an internet accessible website. In other embodiments, the user device 114 may be a mobile device associated with the consumer 110. Example mobile devices can include smartphones (iphone, Android phones, Windows phones, etc.), tablet computers (iPad, Android tablet, Microsoft Surface, etc.), laptop computers, wearable devices, or any other device capable of communicating with the work event monitoring system 102. In one embodiment, the user device 114 is used to provide access to the work event monitoring system 102.

In some embodiments, the work event monitoring system 102 may be configured to generate one or more smart contracts 118. The smart contracts 118 may be computer protocols that facilitate, verify, or enforce the performance of a contract. In one embodiment, the work event monitoring system 102 may generate the smart contracts 118 based on terms agreed upon by the supplier 108 and the consumer 110 as related to an access economy service. For example, where the access economy service is a ride sharing service, the smart contracts 118 may include terms such as rate per unit of distance, responsibility of fees (i.e. tolls, parking fees, etc.), surcharges, responsibility of the driver, etc. In other examples, the smart contracts 118 may include retainers or advance payments for certain services, such as legal or medical services. In one embodiment, the supplier 108 and the consumer 110 may review and accept the terms of the smart contract using personal devices, such as service monitoring device 116, and/or user device 114. However, other devices or methods, such as via a web-portal, may be used to review and accept the terms of the smart contract between the supplier 108 and the consumer 110. The supplier 108 and the consumer 110 may generally agree to the terms of a smart contract during the initial sign-up to participate in the access economy service. As will be described in more detail below, the smart contracts 118 can provide for real-time trickle payments to be made within an access economy service by establishing the terms as to how the payments will be made during performance of the service.

Figure 2:
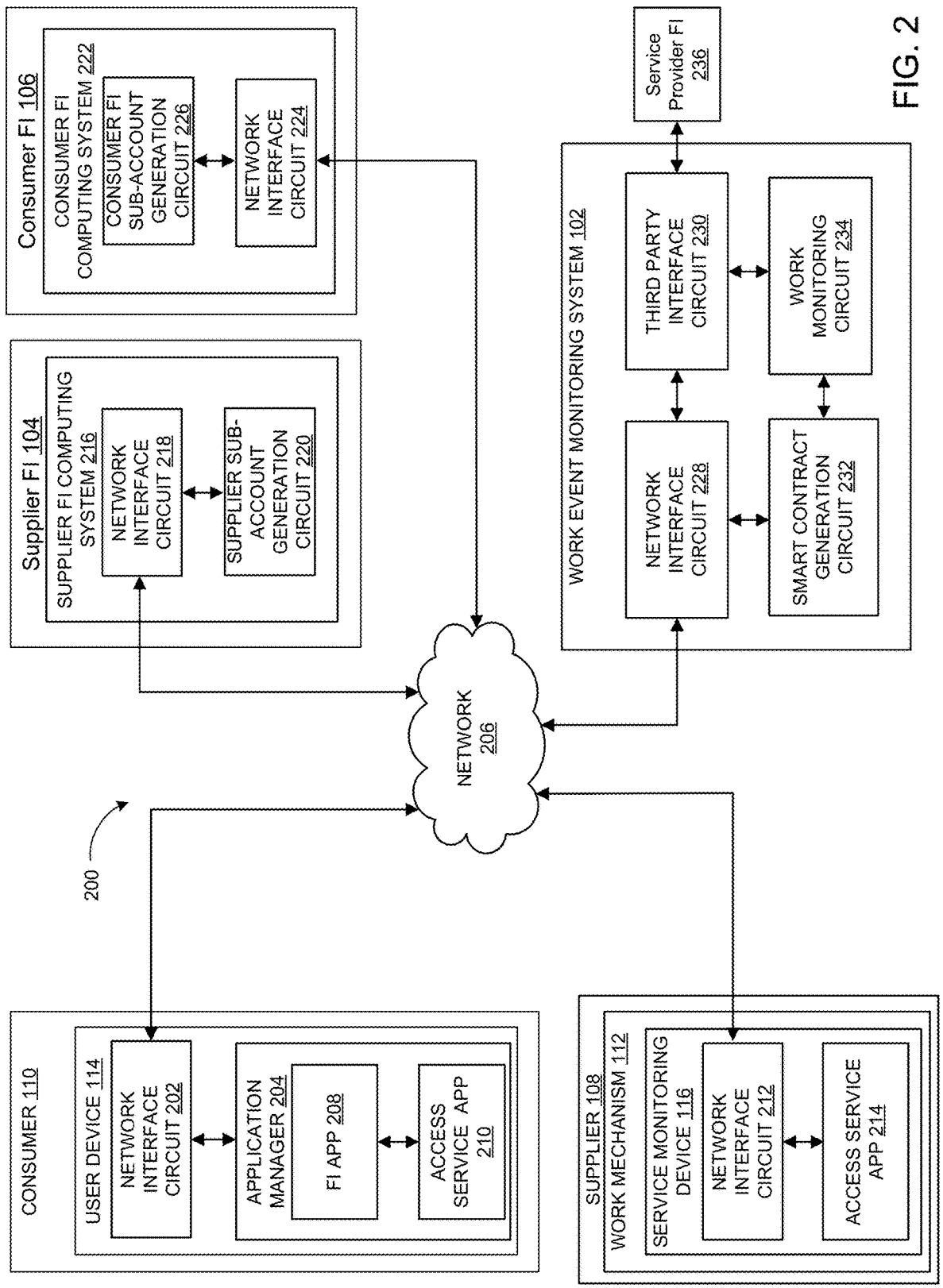
FIG. 2 is a block diagram of a real-time trickle payment system, according to an embodiment.

Turning now to FIG. 2, real-time trickle payment system 200 is shown, according to an embodiment. In one embodiment, the real-time trickle payment system 200 can be configured for use by the access economy service system 100 described above. For purposes of brevity, the system 200 is discussed below in connection with the access economy service system 100 of FIG. 1. However, it should be understood that the real-time trickle payment system 200 can be configured for use with other access economy service systems as well.

As shown in FIG. 2, the consumer 110 may be associated with the user device 114. The user device 114 may have a network interface circuit 202 and an application manager 204. The network interface circuit 202 facilitates data communications to and from a network 206. The network interface circuit 202 may be configured to communicate wirelessly with the network 206, such as via Wi-Fi, Bluetooth, NFC, Zigbee, IR, RF, Cellular (3G, 4G, LTE, CDMA), etc. In other embodiments, the network interface circuit 202 may communicate with the network 206 via a wired connection, such as via Ethernet, a LAN, a WAN, Firewire, USB, or other applicable wired interface. In some embodiments, data passing through the network interface circuit 202 is encrypted.

The application manager 204 is configured to manage one or more software applications (apps) associated with the user device 114. For example, the application manager 204 may manage an FI app 208 and an access service app 210. The FI app 208 may be a mobile banking application associated with an FI used by the consumer 110, such as consumer FI 106. In one embodiment, the FI app 208 allows for direct communication between the user device 114 and the consumer FI 106. In further examples, the FI app 208 may be a mobile wallet application. The access service app 210 may be configured to allow for an interface into an access economy service via the user device 114. For example, the access service app 210 may be an application for use in connection with the work event monitoring system 102. For example, the consumer 110 may download the access service app 210 from the work event monitoring system 102 in order to access the access economy service. Further, as described above, the access service app 210 may serve as a service monitoring device 116 by allowing the consumer 110 to interact with the work event monitoring system 102 as a service is being performed. In one embodiment, the application manager 204 processes requests from the network interface circuit 202 to execute one or more applications. For example, the network interface circuit 202 may receive a request to open the access service app 210 to allow an access economy service transaction to occur. In a further embodiment, the application manager 204 controls access between applications, such as the FI app 208 and the access service app 210.

The supplier 108 may be associated with a work mechanism 112. The work mechanism 112 may be any work mechanism 112 as described above. For example, the work mechanism 112 can be a vehicle, a home, or any other good or service within the access based economy. The work mechanism 112 may be in communication with the service monitoring device 116, as described above. The service monitoring device 116 may include a network interface circuit 212 and an access service app 214. The network interface circuit 212 facilitates data communications to and from the network 206. The network interface circuit 212 may be configured to communicate wirelessly with the network 206, such as via Wi-Fi, Bluetooth, NFC, Zigbee, IR, RF, Cellular (3G, 4G, LTE, CDMA), etc. In other embodiments, the network interface circuit 212 may communicate with the network 206 via a wired connection, such as via Ethernet, a LAN, a WAN, Firewire, USB, or other applicable wired interface. In some embodiments, data passing through the network interface circuit 212 is encrypted.

The access service app 214 may be configured to allow an interface into an access economy service via the user device 114. For example, the access service app 214 may be an application to be used in connection with the work event monitoring system 102. For example, the supplier 108 may download the access service app 210 from the work event monitoring system 102 in order to access the access economy service. Further, as described above, the access service app 214 may work with the service monitoring device 122 to interact with the work event monitoring system 102 as a service is being performed. In some embodiments, the access service app 214 interfaces directly with the work event monitoring system 102 via the network interface circuit 212.

The supplier FI 104 may include a supplier FI computing system 216. The supplier FI computing system 216 may process transaction requests presented to the supplier FI 104. For example, the supplier FI computing system 216 may process all payments associated with the supplier 108 supplying access economy goods and/or services. The supplier FI computing system 216 may include a network interface circuit 218 and a supplier FI sub-account generation circuit 220. The network interface circuit 218 facilitates data communications to and from the network 206. The network interface circuit 218 may be configured to communicate wirelessly with the network 206, such as via Wi-Fi, Bluetooth, NFC, Zigbee, IR, RF, Cellular (3G, 4G, LTE, CDMA), etc. In other embodiments, the network interface circuit 218 may communicate with the network 206 via a wired connection, such as via Ethernet, a LAN, a WAN, Firewire, USB, or other applicable wired interface. In some embodiments, data passing through the network interface circuit 218 is encrypted.

The supplier FI sub-account generation circuit 220 may be configured to generate one or more sub-accounts associated with a specific transaction performed by the supplier 108. As will be discussed in more detail below, these sub-accounts may be used to provide real-time trickle payments to the supplier 108 from the consumer 110 as the supplier 108 supplies access economy goods or services. In some embodiments, the supplier FI sub-account generation circuit 220 may create a sub-account associated with a specific access economy service transaction between the supplier 108 and the consumer 110. The sub-account may have funds deposited to it from the consumer FI 106 with an amount associated with the transaction. A hold may be placed on the funds in the sub-account until the access economy service transaction is complete. In some embodiments, the hold may be released based on a percentage of the transaction having been completed. For example, where the access economy service is a ride-sharing service, an amount may be estimated by the work event monitoring system 102 based on an expected time and distance required to deliver the consumer 110 to their desired destination. Funds may then be transferred to a supplier sub-account within the supplier FI 104 and a hold placed on the funds. As the ride progresses, the hold may be removed in proportion to the percentage of the trip that has occurred. In other examples, funds may be directly transferred in real time between the consumer FI 106 and the supplier FI 104 in proportion to the percentage of the trip that has occurred.

Similar to the supplier FI 104, the consumer FI 106 may include a consumer FI computing system 222. The consumer FI computing system 222 may process transaction requests presented to the consumer FI 106. For example, the consumer FI computing system 222 may process all payments associated with the consumer 110 utilizing an access economy good and/or service. The consumer FI computing system 222 may include a network interface circuit 224 and a consumer FI sub-account generation circuit 226. The network interface circuit 224 facilitates data communications to and from the network 206. The network interface circuit 224 may be configured to communicate wirelessly with the network 206, such as via Wi-Fi, Bluetooth, NFC, Zigbee, IR, RF, Cellular (3G, 4G, LTE, CDMA), etc. In other embodiments, the network interface circuit 218 may communicate with the network 206 via a wired connection, such as via Ethernet, a LAN, a WAN, Firewire, USB, or other applicable wired interface. In some embodiments, data passing through the network interface circuit 218 is encrypted.

The consumer FI sub-account generation circuit 226 may be configured to generate one or more sub-accounts associated with a specific transaction requested by the consumer 110. As will be discussed in more detail below, these sub-accounts may be used to provide real-time trickle payments to the supplier 108 from the consumer 110, as the consumer 110 consumes access economy goods or services. In some embodiments, the consumer FI sub-account generation circuit 226 may create a sub-account associated with a specific access economy service transaction between the supplier 108 and the consumer 110. The sub-account may have funds deposited to it from the consumer FI 106 with an amount associated with the transaction. A hold may be placed on the funds in the sub-account once the access economy service transaction is completed. In some embodiments, the hold may be increased based on a percentage of the transaction having been completed. For example, where the access economy service is a ride-sharing service, an amount may be estimated by the work event monitoring system 102 based on an expected time and distance required to deliver the consumer 110 to their desired destination. Funds may then be transferred to a supplier sub-account within the supplier FI 104 and a hold placed on the funds. As the ride progresses, the hold may be increased in proportion to the percentage of the trip that has occurred. The process for providing real-time trickle payments will be discussed in more detail below.

The real-time trickle payment system 200 further includes the work event monitoring system 102. As described above, the work event monitoring system 102 can provide access to the access based economy for both the supplier 108 and the consumer 110. The work event monitoring system 102 may include a network interface circuit 228, a third party interface circuit 230, a smart contract generation circuit 232, and a work monitoring circuit 234. The network interface circuit 228 facilitates data communications to and from a network 206. This can allow the work event monitoring system 102 to be in communication with the user device 114, the service monitoring device 116, the supplier FI 104, the consumer FI 106, as well as other systems and devices in communication with the network 206. The network interface circuit 228 may be configured to communicate wirelessly with the network 206, such as via Wi-Fi, Bluetooth, NFC, Zigbee, IR, RF, Cellular (3G, 4G, LTE, CDMA), etc. In other embodiments, the network interface circuit 202 may communicate with the network 206 via a wired connection, such as via Ethernet, a LAN, a WAN, Firewire, USB, or other applicable wired interface. In some embodiments, data passing through the network interface circuit 228 is encrypted.

The third party interface circuit 230 can allow a third party, such as an access economy service provider to interface with the work event monitoring system 102. For example, the service provider may want to directly interface with the work event monitoring system 102 to ensure proper service is being provided. In other examples, the service provider may interface with the work event monitoring system 102 via the third party interface circuit 230 to determine what, if any, fees are due to be paid to the service provider as part of providing access to the access economy service. In some embodiments, the third party interface circuit 230 may be in communication with a service provider FI 236 to process payments allocated to the service provider. For example, the third party interface circuit 230 may be in contact with the consumer FI 106 to coordinate payments between the consumer FI 106 and an FI associated with the service provider.

The smart contract generation circuit 232 can generate one or more smart contracts associated with a transactions, such as the smart contracts 118 described above. In one embodiment, the smart contract generation circuit 232 may be in communication with both the user device 114 and the service monitoring device 116 and can provide terms and conditions associated with the requested access economy good or service to the supplier 108 and the consumer 110. For example, basic terms and conditions may be set by the work event monitoring system 102 (i.e. the service provider) and transmitted to both the supplier 108 and the consumer 110. The supplier 108 and consumer 110 can then choose to accept or reject the proposed terms and conditions. If the supplier 108 and consumer 110 accept the terms and conditions, then the smart contract can be generated and executed. In other examples, the supplier 108 and the consumer 110 may be able to establish terms and conditions between themselves. The supplier 108 and the consumer 110 can then provide terms and conditions to the smart contract generation circuit 232. In some embodiments, the smart contract generation circuit 232 automatically generates the smart contract. For example, the smart contract generation circuit 232 may include various algorithms to determine if a contract if the terms and/or conditions would be acceptable to a service provider. If the smart contract generation circuit 232 determines that the terms and conditions meet the criteria set out by the service provider, the smart contract may be generated. In other embodiments, a service provider may be required to evaluate each potential smart contract before the smart contract generation circuit 232 is allowed to generate the smart contract. The smart contract generation circuit 232 may further be able to determine if a smart contract is permitted based on parameters associated with the supplier 108 and the consumer 110. For example, if the supplier FI 104 and/or the consumer FI 106 associated with both the supplier 108 and the consumer 110 are not configured to allow for certain terms and conditions set forth by the supplier 108 and consumer 110, the smart contract generation circuit 232 may not allow the smart contract to be generated. Further, other factors, such as available balance, fee agreements, or other terms and/or conditions, may be deemed unsatisfactory to the smart contract generation circuit 232 based on information related to the supplier 108 and the consumer 110. In some embodiments, the smart contract generation circuit 232 is structured to generate and deploy smart contracts on a blockchain-based system.

The work monitoring circuit 234 may be configured to interface with the service monitoring device 116 to evaluate the amount of work performed related to the access economy good or service that has been contracted between the supplier 108 and the consumer 110. In some embodiments, the work monitoring circuit 234 can determine what work has been performed and update the smart contracts 118 accordingly. For example, the work monitoring circuit 234 may receive an indication of work performed from the service monitoring device 116 via the network interface circuit 228. The work monitoring circuit 234 can then update the actual performance within the smart contracts 118. The work monitoring circuit 234 may then provide the updated performance to both the supplier FI 104 and the consumer FI 106 to allow payments to be processed accordingly. In some embodiments, the work monitoring circuit 234 may update the supplier FI 104 and the consumer FI 106 in real time to allow real-time trickle payments to be made between the supplier 108 and the consumer 110.

The work monitoring circuit 234 may be an application on a user device, such as user device 114. The work monitoring circuit 234 may have access to various data related to the work being performed via the application. For example, the work monitoring circuit may have access to a Global Positioning Satellite (GPS) application on the user device 114, which allows for a location of the consumer 110 to be determined. In one embodiment, the work monitoring circuit 234 is a GPS transponder associated with the work mechanism 112 and/or the consumer 110, via user device 114. In other embodiments, the work monitoring circuit 234 may be a sensing device for sensing one or more consumers 110 using a good or service provided by the supplier 108. For example, a good or service provided by the supplier 108 may have one or more sensors to determine when a consumer 110 is using the goods or services. In some embodiments, the sensors are integrated or a part of the work mechanism 112. In some embodiments, the sensors can determine an identity of the consumer 110 using the good or service. For example, the sensors may be an RFID sensor for sensing an RFID chip associated with the consumer 110. In other embodiments, the sensors may be cameras or other optical sensors in combination with facial recognition system for determining an identity of the consumer 110. These sensors can determine that a consumer 110 is using the good or service, and when the consumer 110 is no longer using the goods or service. Other sensors may include audio sensors, motion sensors, etc.

In some embodiments, the work monitoring circuit 234 may be in communication with user device 114. The user device 114 may include one or more communication mechanisms, such as Wi-Fi, Bluetooth, Cellular, etc. The work monitoring circuit 234 may be configured to communicate with the user device via one of the communication mechanisms. The work monitoring circuit 234 may use that connection to determine an identity of the consumer 110, and whether the consumer 110 is currently using a good or service of the supplier 108. In other embodiments, the work monitoring circuit is a dedicated device for monitoring the use of a good or service by a consumer 110. The dedicated device may monitor identities of the consumer, location of the consumer and/or the work mechanism, elapsed time the consumer 110 has used the good or service, and the like. The dedicated device may include a microprocessor and a memory for executing one or more programs configured to monitor the use of the good or service by the consumer 110. The dedicated device may further have one or more sensors, or other inputs for monitoring the consumer's 110 usage, as well as allowing either the consumer 110 or the supplier to interface with the work monitoring circuit 234. In some embodiments, the work monitoring circuit 234 may be a software application installed on a computing device. Computing devices may include laptop computers, smart phones, tablet computers, dedicated work monitoring device, and the like.

Figure 3:
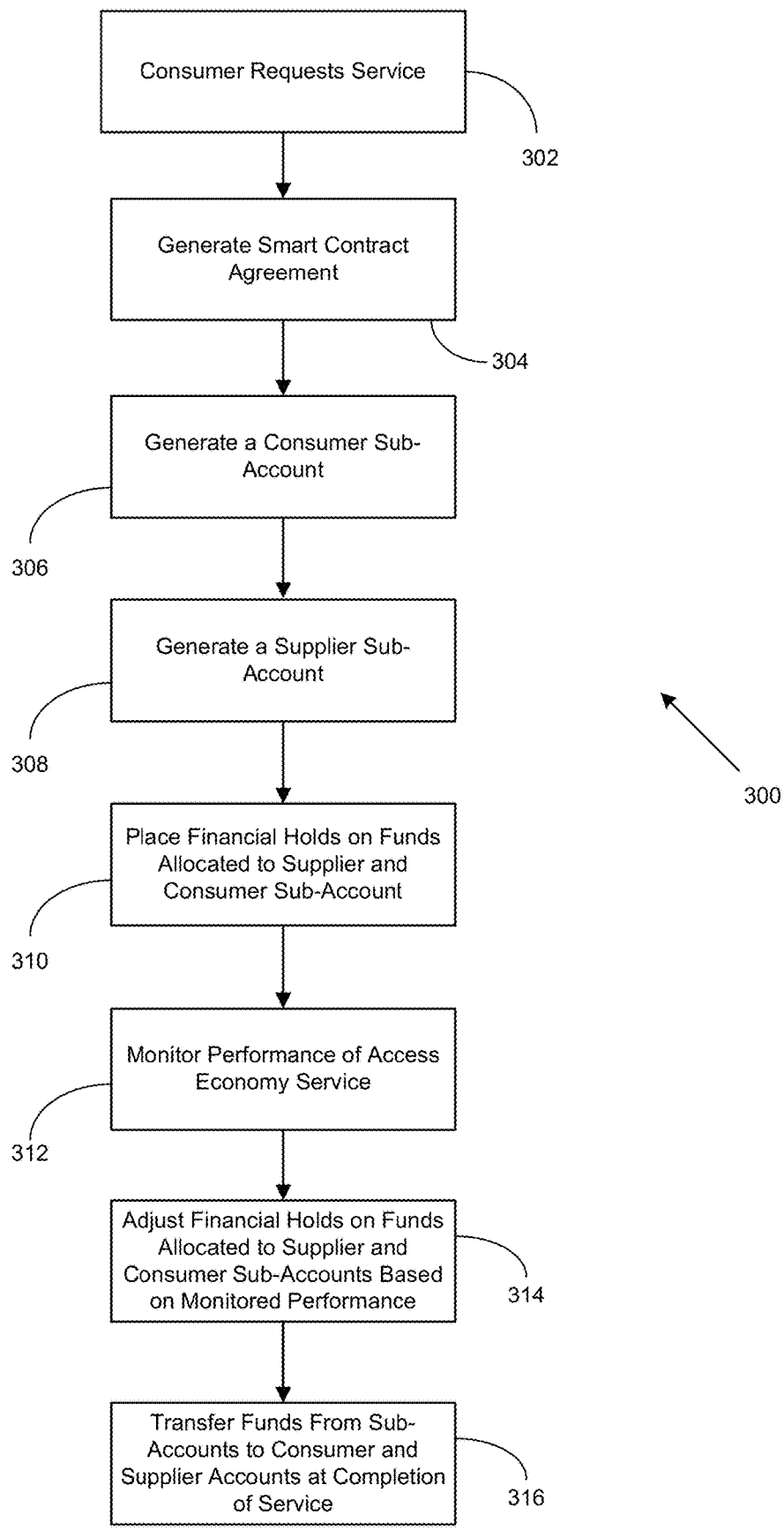
FIG. 3 is a flow diagram of a method for providing real-time trickle payments between a consumer and a supplier, according to various embodiments.

Turning now to FIG. 3, a process 300 for providing real-time trickle payments between a supplier 108 and a consumer 110 is shown, according to some embodiments. For clarity and brevity, the method 300 is discussed below in connection with the systems described above in FIGS. 1-2. At process block 302, the consumer 110 can request an access economy service. For example, where the access economy service is a ride share service, the consumer 110 may use their user device, such as user device 114, to request a ride. The request may be processed by the work event monitoring system 102, which can inform one or more suppliers 108 of the request. In other embodiments, the consumer 110 may use their user device 114 to request a service. The work event monitoring system 102 may receive the request and provide the request to any supplier 108 associated with the access economy service. A supplier 108 may then be able to respond, indicating that they will provide the access economy service requested by the consumer 110.

At process block 304, a smart contract can be generated. In one embodiment, the work event monitoring system 102 can generate a smart contract using the smart contract generation circuit 232. The smart contract can be generated based on the requirements of both the consumer 110 and the supplier 108. As described above, the smart contract terms and conditions can be provided to both the supplier 108 and the consumer 110 for approval. Once the consumer 110 and the supplier 108 agree on the terms and conditions, the smart contract can be established. At process block 306, a consumer sub-account is generated. The consumer sub-account may be associated with a financial account of the consumer 110. The financial account of the consumer 110 may be a financial account designated to provide payment to the supplier 108 under the previously established smart contract. At process block 308, a supplier sub-account is generated. The supplier sub-account may be associated with a financial account of the supplier 108. The financial account of the supplier 108 may be a financial account designated to receive payment from the consumer 110 under the previously established smart contract.

These financial accounts of the consumer 110 and the supplier 108 may be provided by both the consumer 110 and the supplier 108 and may be related to the consumer FI 106 and the supplier FI 104, as described above. In some embodiments, the consumer 110 and the supplier 108 may both designate accounts with the service provider when initially setting up an account associated with the access economy service. For example, the consumer 110 may designate a financial account from which the service provider can remove funds related to the access economy service, and the supplier 108 can designate an account to receive funds from the consumer FI 106 as payment for services rendered. In some embodiments, the accounts are checking accounts associated with the supplier 108 and the consumer 110, respectively. However, other accounts such as savings accounts, credit card accounts, money market accounts, etc. may also be designated by the supplier 108 and/or consumer 110.

At process blocks 306 and 308, a consumer sub-account and a supplier sub-account are generated. In one example, the work event monitoring system 102 may communicate with both the supplier FI computing system 216 and the consumer FI computing system 222 to provide the criteria required to generate the consumer and supplier sub-accounts. For example, the work event monitoring system 102 may estimate a cost to perform the requested access economy service and provide the estimate to both the consumer FI 106 and the supplier FI 104. Provided that the consumer 110 and the supplier 108 had previously agreed to the smart contract, the consumer sub-account and the supplier sub-account may be generated and an estimated amount of funds entered into both sub accounts. At process block 310, financial holds are placed on the funds allocated to the supplier sub-account and the consumer sub-account. For example, the funds placed into the consumer sub-account may be available to the consumer 110 when initially placed into the consumer sub-account, and the funds placed into the sub-account associated with the supplier 108 may have a hold on the entire amount when initial placed into the supplier sub-account. In further embodiments, the funds in the consumer sub-account may have a hold over a portion of the funds which will be transferred to the supplier 108 if the consumer 110 breaches the contract. The amount that may be held due to a potential breach of contract may be determined in process block 304 during the establishment of the smart contract. However, in other embodiments, the amount that may be held may be established by the service provider or via state or local ordinances.

At process block 312, the performance of the requested access economy service is monitored by the work event monitoring system 102. Upon receiving an indication that the performance has begun, the smart contract associated with the transaction is activated For example, the supplier 108 and/or the consumer 110 may indicate that the service has been initiated using a service monitoring device, such as service monitoring device 116. In some embodiments, the service monitoring device 116 may be able to automatically determine when the performance has started and activate the contract without any input from the supplier 108 or the consumer 110. The work event monitoring system 102, upon determining that the smart contract has been activated, may inform other systems or devices that the contract is active. For example, the supplier FI computing system 216 and/or the consumer FI computing system 222 may be notified that the contract has been activated. Further, the work event monitoring system 102 may provide an indication that the contract has been activated to both the consumer 110 and the supplier 108. For example, the consumer 110 may receive a notification that the contract has been activated via the user device 114, and the supplier 108 may receive a notification that the contract has been activated via the service monitoring device 116.

In one embodiment, the work event monitoring system 102 may monitor the progress of the access economy service performance. In other embodiments, the service monitoring device 116 provides performance-related data to the work event monitoring system 102. The work monitoring circuit 234 may process the received data to determine what percentage (or other metric, such as distance travelled, duration of service, etc.) of the contracted service has been completed. In some embodiments, the work monitoring circuit 234 may communicate the percentage, or other metric, to the supplier FI computing system 216 and/or the consumer FI computing system 222. In some embodiments, the supplier FI 104 and the consumer FI 106 may receive data related to the performance of the access economy service directly from the service monitoring device 116. The supplier FI computing system 216 and the consumer FI computing system 222 may receive the percentage or other metric associated with the performance and transfer funds between the consumer FI 106 and the supplier FI 104 at process block 314.

At process block 314 the financial holds on the funds in the consumer sub-account and the funds in the supplier sub-account are adjusted in real-time based on the monitored performance. For example, as the percentage of the performance performed increases, the hold on the funds in the consumer sub-account may be increased, and the hold on the funds in the supplier sub-account may be decreased. In some embodiments, the rate of adjustment of the financial holds in the consumer sub-account and the supplier sub-account are dictated by the terms and conditions in the activated smart contract described above. In other embodiments, funds may be transferred in real-time between the sub-account of the consumer 110 and the sub-account of the supplier 108.

At process block 316, funds are transferred from the consumer sub-account to the consumer FI 106 and from the supplier sub-account to the supplier FI 104. For example, the funds not under a financial hold in the consumer sub-account may be transferred to the designated consumer account, and the funds not under a financial hold in the supplier sub-account may be transferred to the designated supplier account. Finally, the funds remaining on hold in both the consumer sub-account and the supplier sub-account can be netted against each other when the performance has been completed. In one embodiment, funds may also be transferred from the consumer FI 106 to the service provider FI 236 once the service has been completed. The amount of funds transferred to the service provider FI 236 may be controlled by the smart contract associated with the requested access economy service. In other embodiments, the amount of funds transferred to the service provider FI 236 may be determined based on a supplier agreement between the supplier 108 and the work event monitoring system 102. In some instances, the funds may be allocated to the service provider FI 236 from the supplier FI 104 during the performance of the access economy service or after the requested access economy service is completed.

In some embodiments, the consumer 110 may also be a supplier of one access economy good or service at the same time that they are the consumer of a second access economy good or service. For example, a consumer 110 of a ride sharing service may, during the performance of the ride sharing service, provide a separate access economy service. In one example, the consumer 110 may provide a translation or other transactional service while being a consumer of a ride share service. However, other services or goods may be supplied by, the consumer 110, such as those access economy goods and services described above. Accordingly, the process 300 described above may be applied to a service provided by the consumer 110. For example, a financial hold on funds in a supplier sub-account associated with the consumer 110 may be released as the consumer 110 provides an access economy service. As the funds in the consumer 110 supplier sub-account are released, they may be made available to the consumer sub-account for use in the payment of the supplier 108 supplied access economy good or service. Thus, the consumer 110 may be able to generate funds for payment of the service economy good or service provided by the supplier 108 in real-time by performing an access economy service, or providing an access economy good, contemporaneously with the service provided by the supplier 108.

Figure 4:
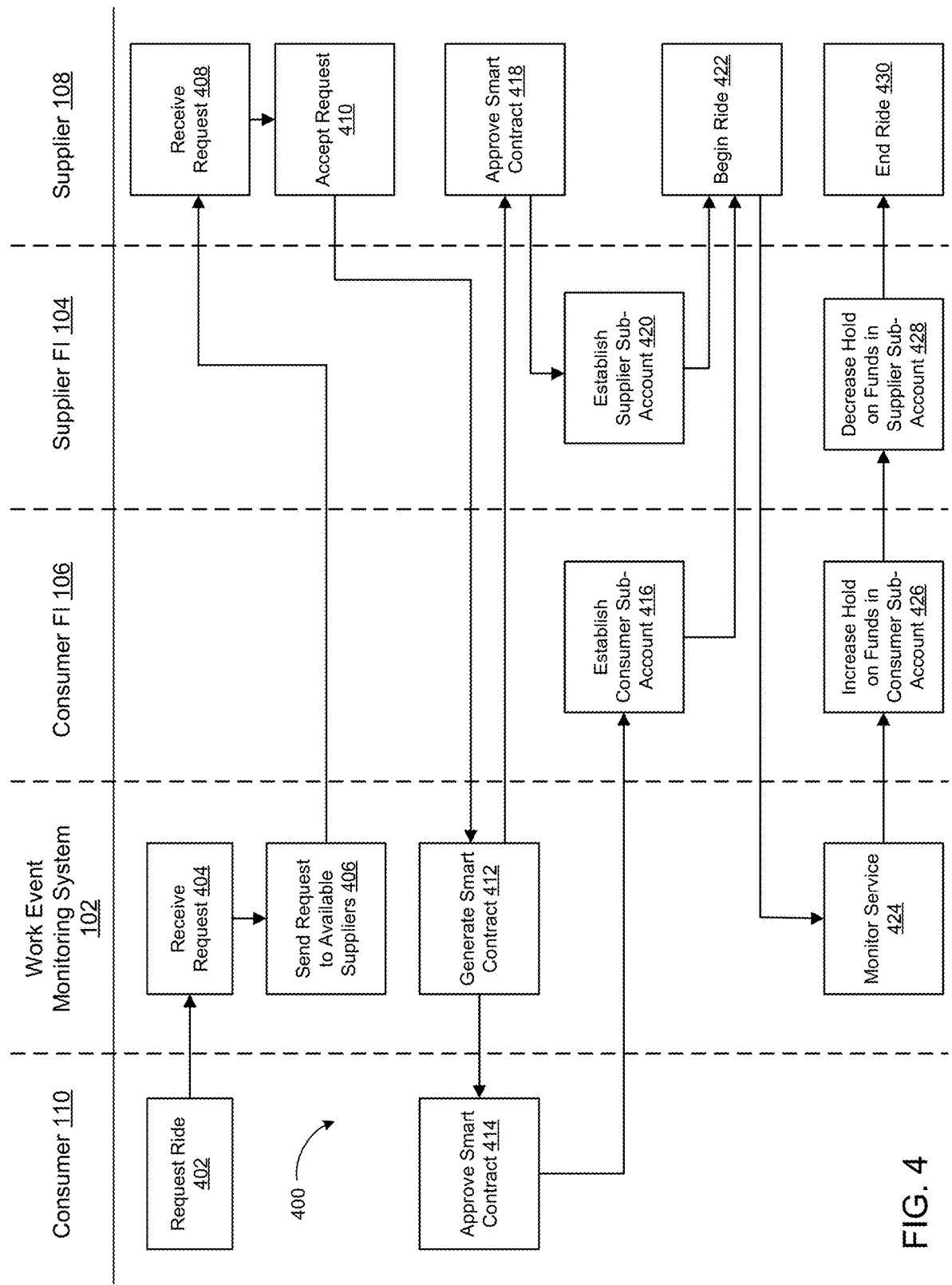
FIG. 4 is a flow diagram illustrating an example implementation of the method shown in FIG. 3.

Turning now to FIG. 4, an example implementation 400 of the above process 300 is shown, according to an embodiment. FIG. 4 is presented as a ride sharing implementation of the process 300. However, the implementation 400 is applicable to other types of services provided by the supplier 108, as described above. At process block 402, the consumer 110 may request a ride from a ride-sharing service. In some embodiments, the consumer 110 may request the ride using a software application located on a user device, such as user device 114, associated with the consumer 110. In other embodiments, the consumer 110 may request the ride using an internet-based interface, such as via a website associated with the ride sharing service. The above examples of the consumer 110 requesting the ride from the ride sharing service are not intended to be limiting, as other methods may be used to request the ride by the consumer 110.

At process block 404, the work event monitoring system 102 receives the request from the consumer 110. The work event monitoring system 102 can then process the request and send the request to available suppliers 108 at process block 406. In one embodiment, the work event monitoring system 102 may determine which suppliers 108 are in a particular geographic location in relation to the consumer 110. The supplier 108 receives the processed request at process block 408. At process block 410, the supplier 108 accepts the request. At process block 412, upon a supplier 108 accepting the request, the work event monitoring system 102 generates a smart contract for review and acceptance by the supplier 108 and the consumer 110. The smart contract may contain terms and conditions associated with the requested service. For example, the smart contract may include terms and conditions, such as agreed upon origin and destination, rate per unit of distance (e.g. $0.25 per 0.1 miles), rate per duration of trip in time (e.g. $0.25 per minute), base charges (e.g. minimum service fees), fees (e.g. payment responsibility for tolls, etc.), surcharges (fuel, maintenance), taxes, additional passenger fees, additional stop fees, etc. The smart contract may further include a percentage of the payment required to be paid to the service provider. The smart contract may further include terms regarding penalties for terminating the service, either by the supplier 108 or the consumer 110, prior to the agreed upon destination being reached. Other terms and conditions may also be included in the smart contract, as applicable for a particular service.

At process block 414, the consumer 110 may approve the smart contract. In some embodiments, the consumer 110 may have an ability to modify the smart contract if there are certain terms or conditions they wish to change. For example, the consumer 110 may be able to use a software application on their user device 114. Where the consumer 110 modifies one or more terms or conditions of the smart contract, the smart contract may be returned to the work event monitoring system 102 for approval. Once the consumer 110 approves the smart contract, a consumer sub-account associated with the transaction is established at the consumer FI 106 at process block 416. For example, the sub-account may be generated by the consumer FI sub-account generation circuit 226. In one embodiment, the consumer sub-account is used for a single transactions. In other embodiments, the sub-account may be used for all transactions associated with a particular access economy service, such as a ride sharing service. In some embodiments, the smart contract may include an estimate of the cost for providing the ride. This amount may be deposited to the sub-account to provide payment associated with the transaction. In some examples, an additional amount may be deposited to the sub-account to account for potential errors in the estimation due to unexpected delays, such as traffic jams. In one example, the additional amount may be 10% of the estimated cost; however, additional amounts of more than 10% or less than 10% are also contemplated. In some embodiments, if the actual cost exceeds the amount placed into the sub-account, the consumer 110 may have the option to allow additional funds to be placed into the consumer sub-account to continue the transaction. In other embodiments, the smart contract lays out the maximum cost which is the amount that is transferred into the consumer sub-account.

Similarly, the supplier 108 may receive the smart contract and approve the smart contract at process block 418. In some embodiments, the supplier 108 may have an ability to modify the smart contract if there are certain terms or conditions they wish to change. For example, the supplier 108 may be able to use a software application on the service monitoring device 116. Where the supplier 108 modifies one or more terms or conditions of the smart contract, the smart contract may be returned to the work event monitoring system 102 for approval. Once the supplier 108 approves the smart contract, a supplier sub-account associated with the transaction is established at the supplier FI 104 at process block 420. In one embodiment, the supplier sub-account is used for a single transaction. In other embodiments, the sub-account may be used for all transactions associated with a particular access economy service, such as a ride sharing service. In other embodiments, the smart contract may include an estimate of the cost for providing the ride. This amount may be allocated into the supplier sub-account to provide payment associated with the transaction. In some examples, an additional amount may be allocated to the supplier sub-account to account for potential errors in the estimation due to unexpected delays, such as traffic jams. In one example, the additional amount may be 10% of the estimated cost; however, additional amounts of more than 10% or less than 10% are also contemplated. In some embodiments, if the actual cost exceeds the amount placed into the sub-account, the supplier 108 may have the option to allow additional funds to be placed into the consumer sub-account to continue the transaction. In other embodiments, the smart contract lays out the maximum cost which is the amount that is transferred into the consumer sub-account. In some embodiments, the supplier FI 104 may deposit actual funds into the supplier sub-account and place a hold on the funds until the transaction, or a portion of the transaction, is performed. In some embodiments, the supplier FI 104 can communicate with the consumer FI 106 to ensure that the consumer FI 106 has enough funds to cover the estimated cost of the transaction.

Once the sub accounts for both the consumer 110 and the supplier 108 have been established, the ride may be approved at process block 422, and the progress of the transaction may be monitored at process block 424. In one embodiment, the transaction may be monitored by the work event monitoring system 102. The work event monitoring system 102 may receive data related to the progress of the transaction from the service monitoring device 116. As described above, the service monitoring device 116 may be a device, such as smartphone, associated with the supplier 108 that is capable of tracking the progress of the transaction. In some embodiments, the consumer 110 may be in possession of the service monitoring device 116 or a supplemental service monitoring device. The supplemental service monitoring device may be capable of providing similar data to that of the service monitoring device 116 associated with the service monitoring device 116 associated with the supplier 108.

The work event monitoring system 102 may provide the status of the performance of the service to the consumer FI 106. For example, the work event monitoring system 102 may monitor the distance travelled and provide that data to the consumer FI 106. In some embodiments, the work event monitoring system 102 may transmit the progress to the consumer FI 106 as a function of the cost of the ride at a given point of time. The consumer FI 106 can then increase the hold on the funds in the consumer sub-account at process block 426. In some embodiments, the consumer FI 106 simply increases the hold placed on the funds in the sub-account in an amount equal to the current percentage of the transaction that is complete. In some embodiments, the work event monitoring system 102 can be in constant communication with the consumer FI 106 to allow for real-time allocation of the financial hold of the funds in consumer sub-account for the duration of the transaction. At process block 428, the supplier FI 104 decreases the hold on the funds in the supplier sub-account. In one embodiment, the supplier FI 104 decreases the hold by the amount the hold is increased in the consumer sub-account. In some embodiments, the consumer FI 106 and the supplier FI 104 are in communication to allow for continuous modifications of the financial holds for the duration of the transaction. In further embodiments, the supplier FI 104 is also in communication with the work event monitoring system 102 to ensure that the proper amount of payment is being allocated to the supplier sub-account via modifying the hold on the funds in the supplier sub-account. At process block 430, the ride can be concluded, and funds are transferred from the consumer sub-account to the consumer FI 106 and from the supplier sub-account to the supplier FI 104. For example, the funds not under a financial hold in the consumer sub-account may be transferred to the designated consumer account, and the funds not under a financial hold in the supplier sub-account may be transferred to the designated supplier account. Finally, the funds remaining on hold in both the consumer sub-account and the supplier sub-account can be netted against each other when the performance has been completed. In some embodiments, the consumer 110 may further be able to allocate additional funds to the supplier sub-account for a tip or for other services rendered. Further, any remaining fees due to the service provider may also be transferred from the consumer sub-account at the end of the ride. In one example, the consumer FI 106 may transfer the funds to the service provider FI 236.

Figure 5:
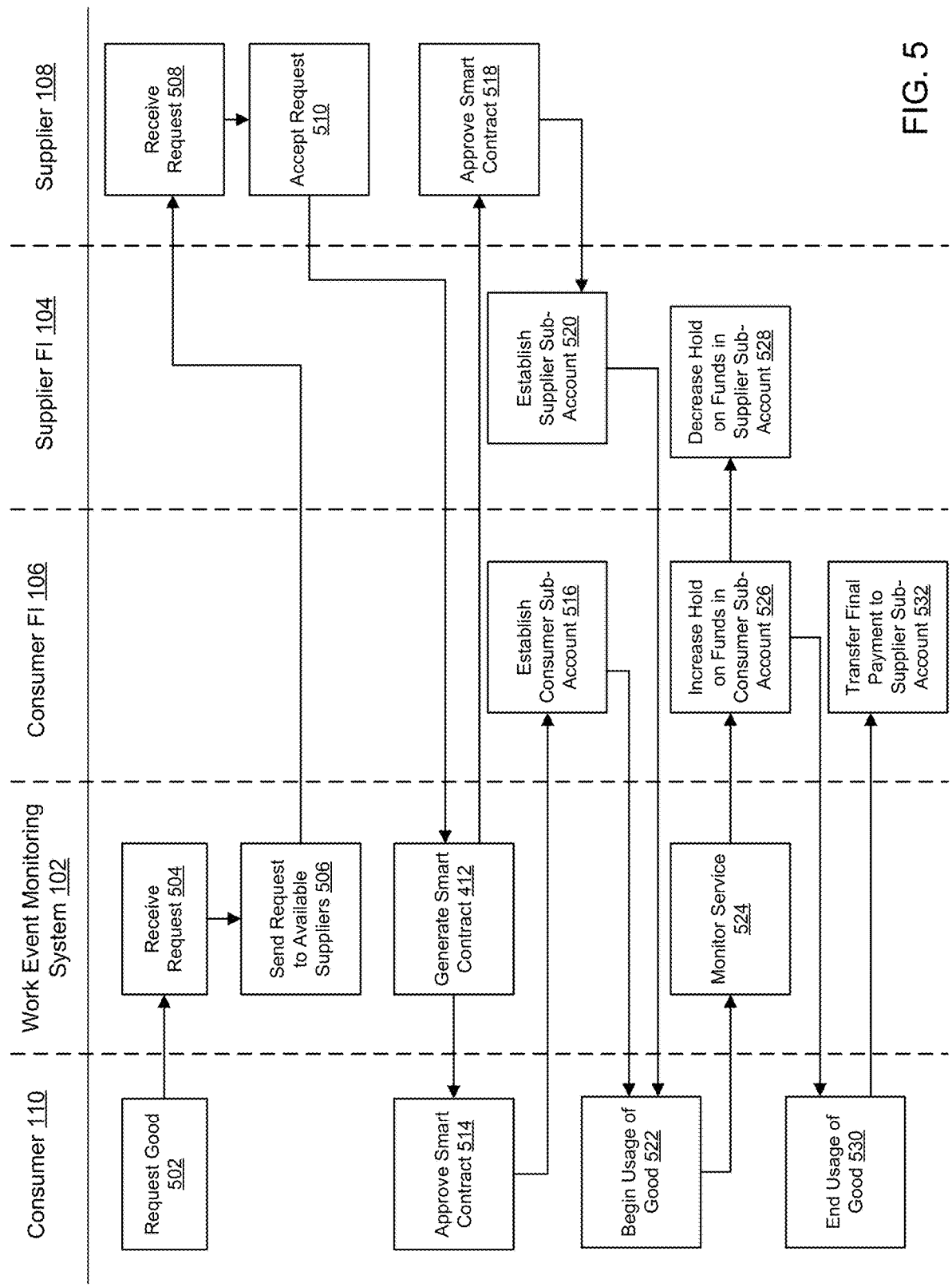
FIG. 5 is a flow diagram illustrating an example implementation of the method shown in FIG. 3.

Turning now to FIG. 5, a further example implementation 500 of the above process 300 is shown, according to an embodiment. FIG. 5 is presented as a goods sharing implementation of the process 300. For example, the implementation 500 may be used for car sharing, home sharing, boat sharing, plane sharing, or sharing of any other real or tangible property. At process block 502, the consumer 110 may request a good from a goods sharing service. In some embodiments, the consumer 110 may request to rent a good using a software application located on a user device, such as user device 114, associated with the consumer 110. In other embodiments, the consumer 110 may request to rent the good using an internet-based interface, such as via a website associated with a goods sharing service provider. The above examples of the consumer 110 requesting to rent a good from the good rental service are not intended to be limiting, as other methods may be used to request the good by the consumer 110.

At process block 504, the work event monitoring system 102 receives the request from the consumer 110. The work event monitoring system 102 can then process the request and send the request to available suppliers 108 at process block 506. In one embodiment, the work event monitoring system 102 may determine which suppliers 108 are in a particular geographic location in relation to the consumer 110. In other embodiments, the work event monitoring system 102 may evaluate which suppliers 108 have a good that meets a criteria set forth by the consumer 110 and send the request to suppliers 108 who have a good that meets the consumer's 110 requirements. A supplier 108 receives the processed request at process block 508. At process block 510, the supplier 108 can accept the request. Upon a supplier 108 accepting the request, the work event monitoring system 102 generates a smart contract for review and acceptance by the supplier 108 and the consumer 110 at process block 512. The smart contract may contain terms and conditions associated with the requested service. For example the smart contract may include terms and conditions such as rental duration, cost per unit of time (e.g. $20.00 per hour, $200 per day, etc.), rate per unit of use (e.g. $0.25 per mile), base charges, fees, surcharges (cleaning, maintenance, wear and tear, etc.), taxes, additional passenger fees, insurance costs, security deposits, etc. The smart contract may further include a percentage of the payment required to be paid to the service provider. The smart contract may further include terms regarding penalties for terminating the service, either by the supplier 108 or the consumer 110, prior to the agreed upon duration of the rental. Other terms and conditions may also be included in the smart contract, as applicable for a particular service.

At process block 514, the consumer 110 may approve the smart contract. In some embodiments, the consumer 110 may have an ability to modify the smart contract if there are certain terms or conditions they wish to change. For example, the consumer 110 may be able to use a software application on the user device 114. Where the consumer 110 modifies one or more terms or conditions of the smart contract, the smart contract may be returned to the work event monitoring system 102 for approval. Once the consumer 110 approves the smart contract, a consumer sub-account is established at the consumer FI 106 at process block 516. In one embodiment, the consumer sub-account is used for a single transaction. In other embodiments, the sub-account may be used for all transactions associated with a particular access economy service, such as a goods rentals service. In some embodiments, the smart contract may include an estimate of the cost for renting the good for a time agreed upon by the consumer 110 and the supplier 108. This amount may be deposited to the sub-account to provide payment associated with the transaction. In some examples, an additional amount may be deposited to the sub-account to account for potential errors in the estimation due to unexpected costs, such as additional rental time required, damage to the goods, fees incurred, etc. In one example, the additional amount may be 10% of the estimated cost; however, additional amounts of more than 10% or less than 10% are also contemplated. In some embodiments, if the actual cost exceeds the amount placed into the sub-account, the consumer 110 may have the option to allow additional funds to be placed into the consumer sub-account to continue the transaction. In other embodiments, the smart contract lays out the maximum cost which is the amount that is transferred into the consumer sub-account. In still further embodiments, the consumer 110 may be required to allocate additional funds to the sub-account to cover any additional incidental costs which may arrive. However, these funds will not be transferred to the supplier FI 104 unless incidental costs arise.

Similarly, the supplier 108 may receive the smart contract and approve the smart contract at process block 518. In some embodiments, the supplier 108 may have an ability to modify the smart contract if there are certain terms or conditions they wish to change. For example, the supplier 108 may be able to use a software application on the service monitoring device 116. Where the supplier 108 modifies one or more terms or conditions of the smart contract, the smart contract may be returned to the work event monitoring system 102 for approval. Once the supplier 108 approves the smart contract, a supplier sub-account associated with the transaction is established at the supplier FI 104 at process block 520. In one embodiment, the supplier sub-account is used for a single transaction. In other embodiments, the supplier sub-account may be used for all transactions associated with a particular access economy service, such as a goods sharing service. In other embodiments, the smart contract may include an estimate of the cost for supplying the good to the consumer 110. This amount may be allocated into the supplier sub-account to provide payment associated with the transaction. In some examples, an additional amount may be allocated to the supplier sub-account to account for potential errors in the estimation due to unexpected events, incidental costs, etc. In one example, the additional amount may be 10% of the estimated cost; however, additional amounts of more than 10% or less than 10% are also contemplated. In some embodiments, if the actual cost exceeds the amount placed into the sub-account, the supplier 108 may have the option to request additional funds to be placed into the consumer sub-account to continue the transaction. In other embodiments, the smart contract lays out the maximum cost which is the amount that is transferred into the supplier sub-account. In some embodiments, the supplier FI 104 may deposit actual funds into the supplier sub-account and place a hold on the funds until the transaction, or a portion of the transaction, is performed. In some embodiments, the supplier FI 104 can communicate with the consumer FI 106 to ensure that the consumer FI 106 has enough funds to cover the estimated cost of the transaction.

Once the sub accounts for both the consumer 110 and the supplier 108 have been established, the rental may begin at process block 522, and the progress of the transaction may be monitored at process block 524. In one embodiment, the transaction may be monitored by the work event monitoring system 102. The work event monitoring system 102 may receive data related to the progress of the transaction from the service monitoring device 116. As described above, the service monitoring device 116 may be a device, such as smartphone, associated with the supplier 108 or the work mechanism 112 that is capable of tracking the progress of the transaction. In some embodiments, the consumer 110 may be in possession of the service monitoring device 116 or a supplemental service monitoring device. The supplemental service monitoring device may be capable of providing similar data to that of the service monitoring device 116 associated with the service monitoring device 116 associated with the supplier 108. For example, where the service is a home rental, the consumer 110 may "check-in" using an application on a user device 114. Once the consumer 110 has "checked-in," the rental is considered to have commenced and the smart contract then governs the allocation of payment between the consumer 110 and the supplier 108.

The work event monitoring system 102 may provide the status of the performance of the service to the consumer FI 106. For example, the work event monitoring system 102 may monitor the duration of the rental and provide that data to the consumer FI 106. In some embodiments, the work event monitoring system 102 may transmit the progress to the consumer FI 106 as a function of the cost of the ride at a given point of time. The consumer FI 106 can then increase the hold on the funds in the consumer sub-account at process block 526. In other embodiments, the consumer FI 106 simply increases the hold placed on the funds in the sub-account in an amount equal to the current percentage of the transaction that is complete. In some embodiments, the work event monitoring system 102 can be in constant communication with the consumer FI 106 to allow for real-time allocation of the financial hold of the funds in consumer sub-account for the duration of the transaction. At process block 528, the supplier FI 104 decreases the hold on the funds in the supplier sub-account. In one embodiment, the supplier FI 104 allocates funds decreases the hold by the amount the hold is increased in the consumer sub-account. In some embodiments, the consumer FI 106 and the supplier FI 104 are in communication to allow for continuous modifications of the financial holds for the duration of the transaction. In further embodiments, the supplier FI 104 is also in communication with the work event monitoring system 102 to ensure that the proper amount of payment is being allocated to the supplier sub-account via modifying the hold on the funds in the supplier sub-account. In some embodiments, allocating funds to the supplier FI 104 can include releasing a hold placed on the funds previously allocated to the supplier sub-account that is equal to the hold placed on the funds in the consumer sub-account. At process block 530, the rental can be concluded. For example, the consumer 110 may "check-out" using a software application on a user device 114, indicating that the rental is completed. At process block 532, funds are transferred from the consumer sub-account to the consumer FI 106 and from the supplier sub-account to the supplier FI 104. For example, the funds not under a financial hold in the consumer sub-account may be transferred to the designated consumer account, and the funds not under a financial hold in the supplier sub-account may be transferred to the designated supplier account. Finally, the funds remaining on hold in both the consumer sub-account and the supplier sub-account can be netted against each other when the performance has been completed. In some embodiments, some funds in the consumer sub-account may continue to have a hold until the supplier 108 verifies the returned of the rented property, as well as the condition thereof. Once the supplier 108 verifies the returned property, any remaining hold on funds within the consumer sub-account may be released. Further, any remaining fees due to the service provider may also be transferred from the consumer 110 sub-account at the end of the ride. In one example, the consumer FI 106 may transfer the funds to the service provider FI 236.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps, and decision steps.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method, the method comprising:
   receiving a request from a first mobile device to commission a service provided by a supplier, wherein the first mobile device is associated with a consumer;
   generating a smart contract in a blockchain based on the requested service between the consumer and the supplier, the smart contract comprising performance terms;
   generating a consumer sub-account associated with a consumer account and a supplier sub-account associated with a supplier account, wherein the consumer sub-account and the supplier sub-account is specific to the request;
   allocating funds to the supplier sub-account;
   placing a financial hold on the funds allocated to the supplier sub-account based on the performance terms of the smart contract;
   receiving, from a global positioning system (GPS) tracking device of a second mobile device of the supplier, geographic information associated with the supplier;
   detecting initiation of performance of the requested service based on the received geographic information, wherein the initiation is detected based on a correlation between the received geographic information associated with the supplier from the GPS tracking device of the second mobile device of the supplier and the performance terms of the smart contract;
   based on the detected initiation, activating the smart contract for performance monitoring;
   based on activation of the smart contract, monitoring the performance of the initiated service by:
      continuously receiving, from the first mobile device of the consumer via a network, first device data of the first mobile device regarding the performance of the initiated service; and
      receiving, from the GPS tracking device tracked geolocation data of the second mobile device of the supplier, the tracked geolocation data associated with a plurality of geographic movements associated with the supplier regarding the performance of the initiated service, wherein the GPS tracking device of the second mobile device is coupled with a software application of the first mobile device; and
   increasing a financial hold on funds allocated to the consumer sub-account associated with the consumer in a hold amount proportional to an amount of the requested service and the monitored performance associated with either the first mobile device or the second mobile device, and decreasing the financial hold on the funds allocated to the supplier sub-account in the hold amount proportional to the amount of the requested service and the monitored performance, wherein the hold amount is determined in real-time based on the first device data of the first mobile device being correlated to the performance terms of the smart contract associated with the consumer and the tracked geolocation data associated with the supplier being correlated to the performance terms of the smart contract associated with the supplier, wherein increasing the financial hold is based on an estimated cost of the requested service, and wherein the estimated cost is calculated based on a status of the performance; and
   upon the completion of the requested service, releasing the funds on hold in the supplier sub-account, wherein the completion is determined based on receiving an indication from the software application of the first mobile device during the performance of the initiated service.

2. The method of claim 1, further comprising:
   generating the consumer sub-account of a consumer financial institution computing system specific to the requested service; and generating the supplier sub-account of a supplier financial institution computing system specific to the requested service.

3. The method of claim 1, wherein detecting initiation of the performance of the requested service is detected without an input from the supplier or the consumer, and execution of the smart contract is based upon detecting the initiation of the performance of the requested service.

4. The method of claim 1, further comprising:
determining the status of the performance of the requested service.

5. The method of claim 1, wherein the smart contract comprises at least one of terms or conditions associated with the requested service, and wherein the at least one of terms or conditions comprises a penalty term for terminating the requested service.

6. A system comprising:
at least one processing circuit configured to:
receive a request from a first mobile device to commission a service provided by a supplier, wherein the first mobile device is associated with a consumer;
generate a smart contract in a blockchain based on the requested service between the consumer and the supplier, the smart contract comprising performance terms;
generate a consumer sub-account associated with a consumer account and a supplier sub-account associated with a supplier account, wherein the consumer sub-account and the supplier sub-account is specific to the request;
allocate funds to the supplier sub-account;
place a financial hold on the funds allocated to the supplier sub-account based on the performance terms of the smart contract;
receive, from a global positioning system (GPS) tracking device of a second mobile device of the supplier, geographic information associated with the supplier;
detect initiation of performance of the requested service based on the received geographic information, wherein the initiation is detected based on a correlation between the received geographic information associated with the supplier from the GPS tracking device of the second mobile device of the supplier and the performance terms of the smart contract;
based on the detected initiation, activate the smart contract for performance monitoring;
based on the detected initiation, monitor, using the smart contract, the performance of the initiated service by:
continuously receiving, from the first mobile device of the consumer via a network, first device data of the first mobile device regarding the performance of the initiated service; and
receiving, from the GPS tracking device tracked geolocation data of the second mobile device of the supplier, the tracked geolocation data associated with a plurality of geographic movements associated with the supplier regarding the performance of the initiated service, wherein the GPS tracking device of the second mobile device is coupled with a software application of the first mobile device; and
increase a financial hold on funds allocated to the consumer sub-account associated with the consumer in a hold amount proportional to an amount of the requested service and the monitored performance associated with either the first mobile device or the second mobile device, and decrease the financial hold on the funds allocated to the supplier sub-account in the hold amount proportional to the amount of the requested service and the monitored performance, wherein the hold amount is determined in real-time based on the first device data of the first mobile device being correlated to the performance terms of the smart contract associated with the consumer and the tracked geolocation data associated with the supplier being correlated to the performance terms of the smart contract associated with the supplier, wherein increasing the financial hold is based on an estimated cost of the requested service, and wherein the estimated cost is calculated based on a status of the performance; and
upon the completion of the requested service, release the funds on hold in the supplier sub-account, wherein the completion is determined based on receiving an indication from the software application of the first mobile device during the performance of the initiated service.

7. The system of claim 6, wherein the at least one processing circuit is further configured to:
generate the consumer sub-account specific to the requested service; and
generate the supplier sub-account specific to the requested service.

8. The system of claim 6, wherein detecting initiation of the performance of the requested service is without an input from the supplier or the consumer indicating initiation, and execution of the smart contract is based upon detecting the initiation of the performance of the requested service.

9. The system of claim 6, further comprising:
determining the status of the performance of the requested service.

10. The system of claim 6, wherein the smart contract comprises at least one of terms or conditions associated with the requested service, and wherein the at least one of terms or conditions comprises a penalty term for terminating the requested service.

11. One or more non-transitory computer-readable storage media having instructions stored thereon that, when executed by at least one processing circuit, cause the at least one processing circuit to:
receive a request from a first mobile device to commission a service provided by a supplier, wherein the first mobile device is associated with a consumer;
generate a smart contract in a blockchain based on the requested service between the consumer and the supplier, the smart contract comprising performance terms;
generate a consumer sub-account associated with a consumer account and a supplier sub-account associated with a supplier account, wherein the consumer sub-account and the supplier sub-account is specific to the request;
allocate funds to the supplier sub-account;
place a financial hold on the funds allocated to the supplier sub-account based on the performance terms of the smart contract;
receive, from a global positioning system (GPS) tracking device of a second mobile device of the supplier, geographic information associated with the supplier;
detect initiation of performance of the requested service based on the received geographic information, wherein the initiation is detected based on a correlation between the received geographic information associated with the supplier from the GPS tracking device of the second mobile device of the supplier and the performance terms of the smart contract;

based on the detected initiation, activate the smart contract for performance monitoring;

based on activation of the smart contract, monitor, using the smart contract, the performance of the initiated service by:

continuously receiving, from the first mobile device of the consumer via a network, first device data of the first mobile device regarding the performance of the initiated service; and receiving, from the GPS tracking device tracked geolocation data of the second mobile device of the supplier, the tracked geolocation data associated with a plurality of geographic movement associated with the supplier regarding the performance of the initiated service, wherein the GPS tracking device of the second mobile device is coupled with a software application of the first mobile device; and increase a financial hold on the funds allocated to the consumer sub-account associated with the consumer in a hold amount proportional to an amount of the requested service and the monitored performance associated with either the first mobile device or the second mobile device, and decrease the financial hold on the funds allocated to the supplier sub-account in the hold amount proportional to the amount of the requested service and the monitored performance, wherein the hold amount is determined in real-time based on the first device data of the first mobile device being correlated to the performance terms of the smart contract associated with the consumer and tracked geolocation data associated with the supplier being correlated to the performance terms of the smart contract associated with the supplier, wherein increasing the financial hold is based on an estimated cost of the requested service, and wherein the estimated cost is calculated based on a status of the performance; and upon the completion of the requested service, release the funds on hold in the supplier sub-account, wherein the completion is determined based on the receiving an indication from the software application of the first mobile device during the performance of the initiated service.

12. The one or more non-transitory computer-readable storage media of claim 11, having additional instructions stored thereon that, when executed by the at least one processing circuit, cause the at least one processing circuit to:

generate the consumer sub-account specific to the requested service; and generate the supplier sub-account specific to the requested service.

13. The one or more non-transitory computer-readable storage media of claim 11, wherein detecting initiation of the performance of the requested service is detected without an input from the supplier or the consumer indicating initiation, and execution of the smart contract is based upon detecting the initiation of the performance of the requested service.

14. The one or more non-transitory computer-readable storage media of claim 11, having additional instructions stored thereon that, when executed by the at least one processing circuit, cause the at least one processing circuit to:

determine the status of the performance of the requested service.

15. The one or more non-transitory computer-readable storage media of claim 11, wherein the smart contract comprises at least one of terms or conditions associated with the requested service, and wherein the at least one of the terms or conditions comprises a penalty term for terminating the requested service.

* * * * *